United States Patent
Masada et al.

(10) Patent No.: US 7,241,501 B2
(45) Date of Patent: *Jul. 10, 2007

(54) IRON NITRIDE MAGNETIC POWDER AND METHOD OF PRODUCING THE POWDER

(75) Inventors: Kenji Masada, Okayama (JP); Takafumi Amino, Okayama (JP); Akira Nagatomi, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 10/991,511

(22) Filed: Nov. 19, 2004

(65) Prior Publication Data

US 2005/0123754 A1  Jun. 9, 2005

(30) Foreign Application Priority Data

Nov. 27, 2003  (JP)  ............................ 2003-396981

(51) Int. Cl.
*B32B 5/16* (2006.01)
(52) U.S. Cl. ...................... 428/402; 428/403; 428/404; 428/405; 428/698; 427/128; 427/129; 427/130
(58) Field of Classification Search ................ 428/403, 428/404, 405, 698, 402; 427/128–130
See application file for complete search history.

(56) References Cited

U.S. PATENT DOCUMENTS 5,225,281 A * 7/1993 Tamai et al. ................ 428/403
5,605,752 A * 2/1997 Matsubayashi ............. 428/323

FOREIGN PATENT DOCUMENTS

| JP | 11-340023 | 12/1999 |
| JP | 2000-277311 | 10/2000 |
| JP | 2001-176715 | 6/2001 |
| WO | 03/079332 A1 | 9/2003 |

* cited by examiner

*Primary Examiner*—Leszek Kiliman
(74) *Attorney, Agent, or Firm*—Clark & Brody

(57) ABSTRACT

An iron nitride magnetic powder comprised primarily of $Fe_{16}N_2$ phase is characterized in that its coercive force Hc is 200 KA/m or greater and bulk switching field distribution BSDF is 2 or less. The magnetic powder can be produced by allowing a nitriding reaction of Fe particles with a nitrogen-containing gas for producing nitrided particles of primarily $Fe_{16}N_2$ phase to proceed under an increased pressure of 0.1 MPa or greater. The enhanced properties of the iron nitride magnetic powder make it suitable as a magnetic material for high-density magnetic recording media.

10 Claims, 2 Drawing Sheets

IRON NITRIDE MAGNETIC POWDER AND METHOD OF PRODUCING THE POWDER

BACKGROUND OF THE INVENTION

1. Field of the Invention

This invention relates to an iron nitride magnetic powder suitable for constituting the magnetic layer of a high recording density medium and a method of producing the powder.

2. Background Art

In order to achieve the increasingly higher recording density required by today's magnetic recording media, efforts are being made to enable use of shorter recording wavelengths. For this, it is necessary to make the magnetic particle size much smaller than the length of the region for recording the short-wavelength signal. If it is not, a distinct magnetic transition cannot be produced, making practical recording impossible. The particle size of the magnetic powder is therefore required to be sufficiently small.

To realize higher recording density, the resolution of the recording signal must be increased. Reduction of magnetic recording medium noise is therefore important. Noise is largely attributable to particle size. The finer the particles, the lower the noise becomes. This also makes it necessary for a magnetic powder used for high density recording to have sufficiently small particle size.

Moreover, a magnetic powder used in a magnetic recording medium enabling high density recording requires high coercive force (Hc) in order to maintain magnetism in the high-density medium and to ensure the output. In addition, coercive force distribution (called Switching Field Distribution: SFD) must be made as narrow as possible because a smaller coercive force distribution range is essential for realizing high-density recording.

Even if such a magnetic powder should be obtained, various problems will nevertheless arise if the thickness of the magnetic layer obtained by applying the powder in the form of a coating material is too thick. This is because self-demagnetization loss, thickness-loss attributable to magnetic layer thickness and other such problems that are not major issues when using conventional long recording wavelengths come to have a pronounced effect and give rise to phenomena that, for instance, make it impossible to realize sufficient resolution. Such phenomena cannot be eliminated only by enhancing the magnetic properties of the magnetic powder or improving surface properties by application of medium production technologies. Magnetic layer thickness reduction is essential. The degree of magnetic layer thickness reduction that can be achieved when a conventional powder having a particle size of around 100 nm is used is limited, so that small particle size is also essential in this aspect.

However, when particle refinement reaches the point that the decrease in particle volume exceeds a certain degree, a marked degradation of magnetic properties occurs owing to thermal fluctuation, and when particle size decreases still further, superparamagnetism is exhibited and magnetism ceases to be exhibited. Another problem is that the increase in specific surface area with increase in particle size refinement degrades oxidization resistance. From this it follows that a magnetic powder suitable for use in a high-density recording medium requires thermal stability enabling it to resist superparamagnetism even when refined, i.e., must be capable of achieving a large anisotropy constant, high Hc, high σs, low SFD and good oxidization resistance, and must be composed of particles fine enough to enable very thin coating. No magnetic material having these properties has been put to practical use heretofore.

JP2000-277311A (Ref. No. 1) describes an iron nitride magnetic material of large specific surface area that exhibits high coercive force Hc and high saturation magnetization σs, and teaches that excellent magnetic properties can be achieved irrespective of shape owing to a synergistic effect between the crystal magnetic anisotropy of an $Fe_{16}N_2$ phase and powder specific surface area enlargement.

JP2001-176715A (Ref. No. 2) describes a low-cost magnetic material exhibiting high saturation magnetization σs as a magnetic powder in which 10–90% of $Fe_{16}N_2$ phase is generated and particularly teaches that the saturation magnetization is maximum when the $Fe_{16}N_2$ phase generation rate is 60%.

As improvements on the magnetic powder of Ref. No. 1, WO 03/079332 A1 (Ref. No. 3) proposes rare earth element-iron-boron system, rare earth element-iron system and rare earth element-iron nitride system magnetic powders composed of substantially spherical or ellipsoid particles and states that a tape medium produced using such a powder has excellent properties, that, in particular, the rare earth element-iron nitride system magnetic powder whose main phase is $Fe_{16}N_2$ is high in saturation magnetism despite being composed of 20 nm particles and also good storage stability because it has a high coercive force of 200 KA/m or greater and a small BET specific surface area, and that use of this rare earth element-iron nitride system magnetic powder enables a dramatic increase in the recording density of a coating-type magnetic recording medium.

This rare earth element-iron nitride system magnetic powder is produced by ammonia nitriding in which rare earth element-iron system magnetic powder obtained by reducing magnetite particles with a surface-adhered rare earth element is nitrided using ammonia gas. Although Ref. No. 3 is said to enable replacement of part of the iron in the rare earth element-iron nitride with another transition metal element, it is pointed out that a long time is required for the nitriding reaction when a large amount of cobalt is added.

JP-Hei11-340023A (Ref. No. 4) discloses the basic invention to obtain an iron-nitride magnetic powder of $Fe_{16}N_2$ phase by a low temperature nitriding method using ammonia gas.

Although Ref. Nos. 1–3 say that a fine magnetic powder with good magnetic properties is obtained when an $Fe_{16}N_2$ phase having large crystal magnetic anisotropy is generated, they do not say that a higher ratio of $Fe_{16}N_2$ phase is always better. For example, Ref. No. 2 states that the highest σs is obtained when the $Fe_{16}N_2$ phase ratio is about 60%. Moreover, regarding the ratio between $Fe_{16}N_2$ phase and α-Fe phase of the magnetic powder inner layer (core portion), Ref. No. 3 says that the core portion need not be entirely $Fe_{16}N_2$ phase but can be a mixed phase including α-Fe and also that the desired coercive force can be easily set by regulating the nitriding conditions. Still, although these conventional technologies present no major problem when only coercive force and saturation magnetization are taken into consideration, when they are considered from the viewpoint of powder coercive force distribution (called as Bulk Switching Field Distribution: BSFD) and tape coercive force distribution (called as Switching Field Distribution: SFDx) in the direction of tape orientation (defined as the "x direction"), the large difference in coercive force between $Fe_{16}N_2$ phase and each of α-Fe phase and $Fe_4N$ phase (which contains even more nitrogen than $Fe_{16}N_2$) causes such a mixed phase to have a broad SFD distribution including two or three maximum values.

The fact that a magnetic powder has a broad bulk switching field distribution means that high and low Hc particles are intermixed. Therefore, when such a magnetic powder is used in a coating material for preparing a tape to be used as a high-density recording medium, noise readily occurs. Moreover, when low Hc components are present, such particles are apt to experience erasure of recorded content because they cannot maintain magnetism owing to thermal fluctuation, so that a reliability problem arises. Therefore, a magnetic powder that is substantially $Fe_{16}N_2$ phase with no mixed in α-Fe phase, $Fe_4N$ phase or the like is preferable as a magnetic powder for a high-recording density magnetic medium. Although JP-Hei-11-340023A (Ref. No. 4) sets out a method of producing $Fe_{16}N_2$ phase particles by low-temperature nitriding, it is silent regarding the crystal state, coercive force Hc and switching field distribution of the product.

As regards the oxidation resistance of an iron nitride magnetic powder comprising $Fe_{16}N_2$, the rare earth element-iron system magnetic powder described in Ref. No. 3, for example, achieves Δσs of 12.6% in a 20 nm average particle diameter magnetic powder comprising a mixture of $Fe_{16}N_2$ and α-Fe phases and containing 5.3 at. % of Y, for example. However, this oxidation resistance probably needs to be increased to a still higher level because specific surface area increases markedly when further particle refinement is carried out. Thus there has not been known a method that can effectively improve the oxidation resistance of an iron nitride magnetic powder comprising $Fe_{16}N_2$ while maintaining its high Hc, high σs and low SFD unchanged.

SUMMARY OF THE INVENTION

An object of the present invention is therefore to provide an $Fe_{16}N_2$ system iron nitride powder that achieves excellent magnetic properties enabling use in a high-recording density magnetic medium, particularly high Hc and low BSFD, together with good oxidation resistance.

Through extensive research and experimentation directed at achieving the aforesaid object, the inventors discovered that an iron nitride magnetic powder composed substantially of $Fe_{16}N_2$ can be stably produced by allowing a nitriding reaction of Fe particles with a nitrogen-containing gas, typically ammonia gas, for producing nitrided particles of primarily $Fe_{16}N_2$ phase to proceed under an increased pressure of 0.1 MPa or greater, preferably 0.3 MPa or greater. That is, it was found that conducting the nitriding reaction under increased pressure suppresses generation of other phases such as α-Fe phase and $Fe_4N$ phase to enable production of a powder composed substantially of $Fe_{16}N_2$. The present invention can therefore provide an iron nitride magnetic powder characterized in that its coercive force Hc is 200 KA/m or greater and bulk switching field distribution (BSFD) is 2 or less. This iron nitride magnetic powder is preferably composed of iron nitride particles 80% or more of which are $Fe_{16}N_2$ phase as determined by XRD peak integration and 15% or less of which are of Hc of 120 KA/m or less in the bulk switching field distribution. The average particle diameter thereof is preferably 50 nm or less.

The magnetic powder of the present invention is a high Hc, low SFD fine powder substantially composed of $Fe_{16}N_2$ that can be applied to a coating-type magnetic recording medium to achieve a magnetic recording medium having high recording density. It is therefore capable of enhancing data storage capacity in response to expected increases in the volume of data requiring backup.

DESCRIPTION OF THE PREFERRED EMBODIMENTS

Figure 1:
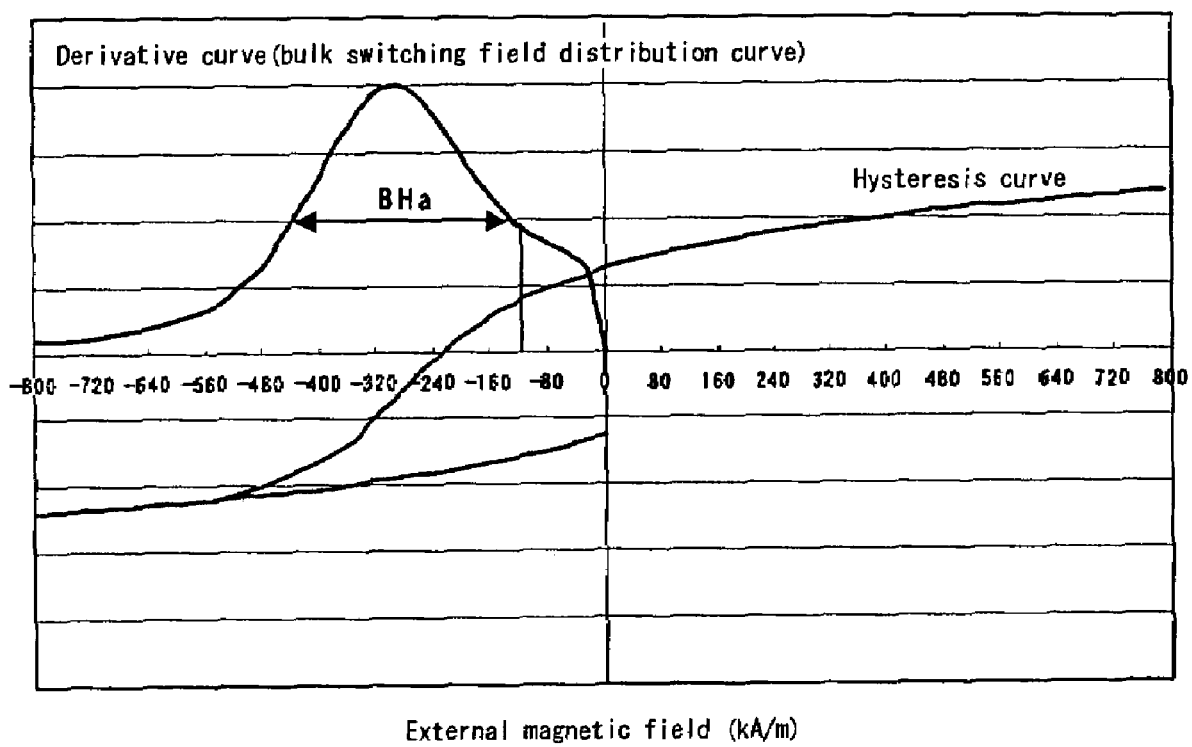
FIG. 1 shows a hysteresis curve and a derivative curve obtained for an iron nitride magnetic powder according to the present invention (Example 1).

After developing the method of producing $Fe_{16}N_2$ phase particles by low-temperature nitriding set out in Ref. No. 4, the inventors continued research into the application of this type of iron nitride magnetic powder to high recording density magnetic recording medium. It was found that when the Fe particle nitriding reaction is allowed to proceed under an increased pressure condition of 0.1 MPa or greater, preferably 0.3 MPa or greater, the coercive force Hc of the powder is improved relative to that when the pressure is not increased, enabling production of a high coercive force powder exhibiting Hc of 120 KA/m or greater and bulk switching field distribution BSFD of 2 or less. The inventors believe that the nitriding conducted under increased pressure probably facilitates generation of $Fe_{16}N_2$ single phase particles of good crystallinity. That is, it is thought that the increased pressure better suppresses generation of other phases than heretofore, thereby making it easier to generate the $Fe_{16}N_2$ phase. It was further found that conducting nitriding under increased pressure allows the nitriding reaction to proceed without requiring a long period for the nitriding even when Co, Ni or other such transition metal element is added and that a magnetic powder composed primarily of $Fe_{16}N_2$ that further contains Co, Ni or the like exhibits good oxidation resistance. As set out in Ref. No. 4, the nitriding reaction temperature need not be very high. A temperature of not higher than 200° C. suffices.

When nitriding treatment is carried out without pressure increase, α-Fe phase remains when the reaction temperature is low and $Fe_4N$ phase is readily generated when the reaction temperature is high, making it difficult to carry out temperature control for obtaining particles of $Fe_{16}N_2$ single phase. As a result, production of a powder material having both high Hc and low BSFD cannot be easily achieved. The present invention achieves production of an iron nitride magnetic powder that exhibits both high Hc and low BSFD by setting the pressure during nitriding at 0.1 MPa or greater, preferably 0.3 MPa or greater. In order for the obtained magnetic powder of primarily $Fe_{16}N_2$ phase to exhibit Hc of 120 KA/m or greater and BSFD of 2 or less, it should consist of 80% or more, preferably 90% or more, of $Fe_{16}N_2$ phase as determined by XRD peak integration.

As the starting material subjected to nitriding under increased pressure can be used Fe (α-Fe) particles (powder). The used Fe powder can be one obtained by reducing or decomposing goethite, hematite, magnetite, wustite, α-Fe, carbonyl iron, iron acetylacetonate or the like. The particular shape is not especially limited and can be any of acicular, spindle shape, spherical, ellipsoid or the like, but the average particle diameter is preferably 50 nm or less, more preferably 20 nm or less. Use of Fe particles of a diameter of 50 nm or less enables production of a magnetic powder composed of $Fe_{16}N_2$ single phase particles of a diameter of 50 nm or less, which powder is a magnetic material suitable for short-wavelength recording. Moreover, the fine particles of a diameter of 50 nm or less make it possible to obtain a high-recording density magnetic medium that is excellent in surface smoothness and low in noise.

In order to prevent sintering of the starting material, the particles may have a sinter preventing agent incorporated in solid solution therein or adhered to the surface thereof in an amount that does not markedly inhibit nitriding. Usable sinter preventing agents include ones that contain Al, Si, Cr, V, Mn, Mo, Ni, P, B, Zr, a rare earth element (defined as including Y) or the like. However, when goethite is used as the starting material, an Al-system agent that readily enters solid solution is suitable, and when magnetite or the like is used, an Si-system agent that readily enters solid solution or adheres to the particles is suitable. Moreover, since Al and Si have a nitriding promoting effect, their addition is still more preferable from the viewpoint of further enhancing magnetic properties and improving productivity.

As the sinter preventing agents, the combination of Al and a rare earth element (defined as including Y) or the combination of Si and a rare earth element (defined as including Y) can be preferably adopted to enhance the above effects. When they are used in the combination, Al content can be in the range of 5–30 at. % based on Fe, Si content can be in the range of 1–10 at. % based on Fe and a rare earth element (defined as including Y) can be in the range of 0.5–10 at. % based on Fe. If their contents are lower than each lower limit above, it is hard to obtain the sinter preventing effect, and when their contents are higher than each upper limit above, non-magnetic components are excessively increased thereby to render the saturation magnetization insufficient.

The oxidation resistance of the iron nitride magnetic powder comprising $Fe_{16}N_2$ phase can be improved by adding one or both of Co and Ni to the starting material. The total amount Co and/or Ni added expressed in atomic percent based on Fe is preferably 0.1–30 at. %, more preferably 10–30 at. %. When the total added amount is less than 0.1 at. %, no oxidation resistance improvement effect is observed, and when it exceeds 30 at. %, a long period is required for the nitriding reaction, which is undesirable. Addition of one or both of Co and Ni in a total amount of 0.1–30 at. %, preferably 10–30 at. %, is appropriate from the aspects of both oxidation resistance and nitriding reaction. The present invention enables production of an iron nitride magnetic powder whose $\Delta\sigma s$, an index of oxidation resistance, is 15% or less.

The reducing agent used in the reduction treatment for obtaining α-Fe is not particularly defined and can be of any type capable of decomposing or reducing the starting material powder to α-Fe. In reduction by the dry method, however, hydrogen ($H_2$) can be used. In this case, insufficient reduction that results in residual oxygen is undesirable because it greatly slows the nitriding speed. An excessively high temperature during reduction causes sintering between the particles, thereby increasing the average particle diameter and degrading dispersibility. The reduction should therefore be conducted at a temperature of 500° C. or lower, for example, at a temperature in the range of 300–500° C.

The nitriding of Fe particles (powder) in accordance with the present invention is preferably carried out using a nitrogen-containing gas, typically ammonia gas, under an increased pressure of 0.1 MPa or greater, preferably 0.3 MPa or greater, at a temperature of 200° C. or lower for between several hours and several tens of hours. The pressurization method is not particularly defined. One convenient method is to blow ammonia gas or a mixed gas containing ammonia gas into a furnace capable of withstanding pressure increase and controlling the pressure on the upstream and downstream sides of the furnace to regulate the pressure in the furnace. The amount of oxygen in the gas passed through the furnace is preferably less than a few ppm.

Thus the present invention can produce an iron nitride magnetic powder substantially composed of $Fe_{16}N_2$ phase and the magnetic powder obtained is suitable for use as a magnetic material for a high-density magnetic recording medium. In other words, the present invention can produce a magnetic powder substantially composed of $Fe_{16}N_2$ phase, which has an average particle diameter of 50 nm or less, exhibits Hc of 120 KA/m or greater and BSFD of 2 or less, and has a ratio below Hc 120 KA/m in BSFD of 15% or less. As such, the magnetic powder can serve as a magnetic material for a high-density magnetic recording medium having no problem of thermal fluctuation and no problem of noise generation when made into a tape. Moreover, when the magnetic powder is one that contains one or both of Co and Ni, the resulting excellent oxidation resistance gives it high practical value.

A BSFD exceeding 2, i.e., a wide Hc distribution in the powder that makes the ratio of high Hc components and low Hc components large, causes noise in a tape produced using the magnetic powder, while low Hc magnetic powder is liable to experience erasure of recorded content owing to thermal fluctuation, so that a reliability problem arises. The BSFD is therefore preferably 2 or less.

Although examples of the iron nitride magnetic powder according the present invention will be set out below, the testing methods used to assess the iron nitride magnetic powder properties will be explained first. All property values set out in this specification, including but not limited to those of the Examples, were evaluated in accordance with the following testing methods.

Powder Property Evaluation Methods

Particle size measurement: A number of transmission electron micrographs were taken at 100,000 or more magnifications, the longest portions of 400 or more of the particle images were measured separately for each particle and the average value of the measured lengths was calculated.

Measurement of powder magnetic properties: A VSM (vibrating sample magnetometer, product of Digital Measurement Systems) was used to conduct measurement in an externally applied magnetic field of max. 796 KAm.

Measurement of bulk switching field distribution (BSFD): Using the aforesaid VSM, an external magnetic field of 796 KA/m was first applied in a certain direction (defined as the forward direction), next the external magnetic field was decreased to 0 in 7.96 KA/m decrements and then applied in the reverse direction (negative direction) in 7.96 KA/m increments to produce a hysteresis curve, the half-value width for the peak of the derivative curve of the hysteresis curve drawn in the negative direction (coercive force distribution curve) was defined as BHa, and BSFD was calculated using the following equation:

$$BSFD = BHa/Hc.$$

Calculation of ratio below Hc 120 KA/m in BSFD: Defining the area obtained by integrating the aforesaid coercive force distribution curve over the range of 0 to minus 796 KA/m as 100% of the total coercive force distribution, the ratio below Hc 120 KA/m was calculated as the ratio accounted for by the area obtained by integrating the range below 120 KA/m. In other words, the calculation was done as follows:

Ratio below 120 KA/m=100×(area of coercive force distribution curve below 120 KA/m)/(area of whole coercive force distribution curve).

Measurement of magnetic powder oxidation resistance (Δσs): Following storage of the magnetic powder in a thermo-hygrostat for one week at 60° C., 90% RH, percentage of change in saturation magnetization value σs during storage was calculated using the following equation:

100×{(saturation magnetization value before storage)−(saturation magnetization value after storage)}/(saturation magnetization value before storage).

Specific surface area measurement: Measured by BET method.

Tape Property Evaluation Methods (1) Magnetic Coating Material Preparation

Magnetic powder, 0.500 g, was weighed out and placed in a pot (inside diameter: 45 mm, depth: 13 mm) and allowed to stand for 10 min. with the cover open. Next, 0.700 mL of a vehicle [mixed solution of vinyl chloride resin MR-110 (22 wt %), cyclohexanone (38.7 wt %), acetylacetone (0.3 wt %), n-butyl stearate (0.3 wt %) and methyl ethyl ketone (MEK, 38.7%)] was added to the pot using a micropipette. A steel ball (2φ) 30 g and ten nylon balls (8φ) were immediately added to the pot and the pot was covered and allowed to stand for 10 min. The pot was then set in a centrifugal ball mill (Fritsch P-6) and gradually raised to a final rotating speed of 600 rpm, at which dispersion was continued for 60 min. The centrifugal ball mill was stopped and the pot removed. Using a micropipette, the pot was added with 1.800 mL of a liquid adjuster prepared in advance by mixing MEK and toluene at a ratio of 1:1. The pot was again set in the centrifugal ball mill and rotated at 600 rpm for 5 minutes. This completed the dispersion.

(2) Magnetic Tape Preparation

Upon completion of the foregoing dispersion, the cover of the pot was opened and the nylon balls removed. The coating material, together with the steel ball, was placed in an applicator (55 μm) and coated onto a support film (15 μm polyethylene film marketed by Toray Industries under the product designation 15C-B500). The coated film was promptly placed at the center of the coil of a 5.5 kG magnetic orientation device to orient its magnetic field, and then dried.

(3) Tape Property Evaluation

Magnetic property measurement: The coercive force Hcx, SFDx and SQx of the obtained tape were measured using a VSM under an externally applied magnetic field of max. 796 KA/m.

Measurement of tape oxidation resistance (ΔBm): Following storage of the tape in a thermo-hygrostat for one week at 60° C., 90% RH, percentage of change in Bm during storage was calculated.

EXAMPLES

Example 1

As starting material was used a powder composed of 27 nm average diameter magnetite particles having a surface layer of Si and Y oxides (Si and Y content expressed as atomic percent based on Fe of 4.7 at. % and 1.0 at. %, respectively). The powder was placed in a furnace, heated, and reduced in a stream of hydrogen gas at 500° C. for one hour. It was then cooled to 100° C., at which temperature the gas of the gas stream was changed from hydrogen to ammonia, and thereafter heated to 165° C. At this temperature, the outlet pressure of the discharge gas was regulated to put the furnace under a controlled pressurized condition of 0.1 MPa. Nitriding was conducted for 11 hours under this pressurized condition.

After the nitriding treatment, the outlet pressure of the discharge gas was returned to atmospheric pressure to discontinue the pressurization, whereafter the temperature was lowered to 80° C. and the gas of the gas stream was changed to nitrogen gas to which was added a small amount of air so as to impart an oxygen concentration of 0.01–2 vol. % and subject the surface of the powder under treatment to slow oxidation. The powder was then taken out into the air.

The powder obtained had an average particle diameter of 25 nm and a BET specific surface area of 43 $m^2/g$. The results of magnetic property evaluation were: Hc=224 KA/m, σs=111 $Am^2/Kg$, and BSFD=1.41. The powder oxidation resistance Δσs was 19.8% and the ratio below Hc 120 KAm in the BSFD was 11.6%. FIG. 1 shows the hysteresis curve and derivative curve obtained for the iron nitride magnetic powder of this example.

The properties of a tape prepared using the magnetic powder of this Example were evaluated. The results were: Hcx=251 KA/m, SFDx=0.66, SQx=0.73, and tape oxidation resistance ΔBm of 9.8%.

Example 2

Example 1 was repeated except that the outlet pressure of the discharge gas was regulated to put the furnace under a controlled pressurized condition of 0.3 MPa.

The powder obtained had an average particle diameter of 25 nm and a BET specific surface area of 44 $m^2/g$. The results of magnetic property evaluation were: Hc=239 KA/m, σs=97 $Am^2/Kg$, and BSFD=1.31. The powder oxidation resistance Δσs was 23.7% and the ratio below Hc 120 KAm in the BSFD was 9.3%. The evaluated tape properties were: Hcx=265 KA/m, SFDx=0.56, SQx=0.75, and tape oxidation resistance ΔBm of 11.8%.

Example 3

Example 1 was repeated except that the starting material used was 20 nm average diameter goethite particles containing Al and Y as sinter preventing agents at atomic percents based on Fe of 9.4 at. % and 1.9 at. %, respectively.

The powder obtained had an average particle diameter of 15 nm and a BET specific surface area of 69 $m^2/g$. The results of magnetic property evaluation were: Hc=214 KA/m, σs=67 $Am^2/Kg$, and BSFD=1.77. The powder oxidation resistance Δσs was 35.3% and the ratio below Hc 120 KAm in the BSFD was 13.2%. The evaluated tape properties were: Hcx=233 KA/m, SFDx=0.71, SQx=0.70, and tape oxidation resistance ΔBm of 16.8%.

Example 4

Example 1 was repeated except that the starting material used was 20 nm average diameter goethite particles containing Co at an atomic percent based on Fe of 3.0 at. % (and also containing Al and Y as sinter preventing agents at 9.1 at. % and 1.0 at. %, respectively).

The powder obtained had an average particle diameter of 15 nm and a BET specific surface area of 66 $m^2/g$. The results of magnetic property evaluation were: Hc=210 KA/m, σs=71 $Am^2/Kg$, and BSFD=1.80. The powder oxidation resistance Δσs was 14.5% and the ratio below Hc 120

KAm in the BSFD was 13.5%. The evaluated tape properties were: Hcx=228 KA/m, SFDx=0.73, SQx=0.70, and tape oxidation resistance ΔBm of 8.0%.

Example 5

Example 1 was repeated except that the starting material used was 25 nm average diameter goethite particles containing Co at an atomic percent based on Fe of 20 at. % (and also containing Al and Y as sinter preventing agents at 9.1 at. % and 1.0 at. %, respectively).

The powder obtained had an average particle diameter of 21 nm and a BET specific surface area of 55 $m^2/g$. The results of magnetic property evaluation were: Hc=221 KA/m, σs=104$Am^2/Kg$, and BSFD=1.52. The powder oxidation resistance Δσs was 8.7% and the ratio below Hc 120 KAm in the BSFD was 11.8%. The evaluated tape properties were: Hcx=244 KA/m, SFDx=0.68, SQx=0.71, and tape oxidation resistance ΔBm of 4.6%.

Example 6

Example 1 was repeated except that the starting material used was 25 nm average diameter goethite particles containing Ni at an atomic percent based on Fe of 10 at. % (and also containing Al and Y as sinter preventing agents at 9.1 at. % and 1.0 at. %, respectively).

The powder obtained had an average particle diameter of 20 nm and a BET specific surface area of 57 $m^2/g$. The results of magnetic property evaluation were: Hc=218 KA/m, σs=102 $Am^2/Kg$, and BSFD=1.62. The powder oxidation resistance Δσs was 9.0% and the ratio below Hc 120 KAm in the BSFD was 12.1%. The evaluated tape properties were: Hcx=230 KA/m, SFDx=0.69, SQx=0.71, and tape oxidation resistance ΔBm of 4.9%.

Comparative Example 1

Example 1 was repeated except that outlet pressure of the discharge gas was released into the atmosphere so as not to pressurize the furnace interior (furnace pressure was not higher than 0.01 MPa).

Figure 2:
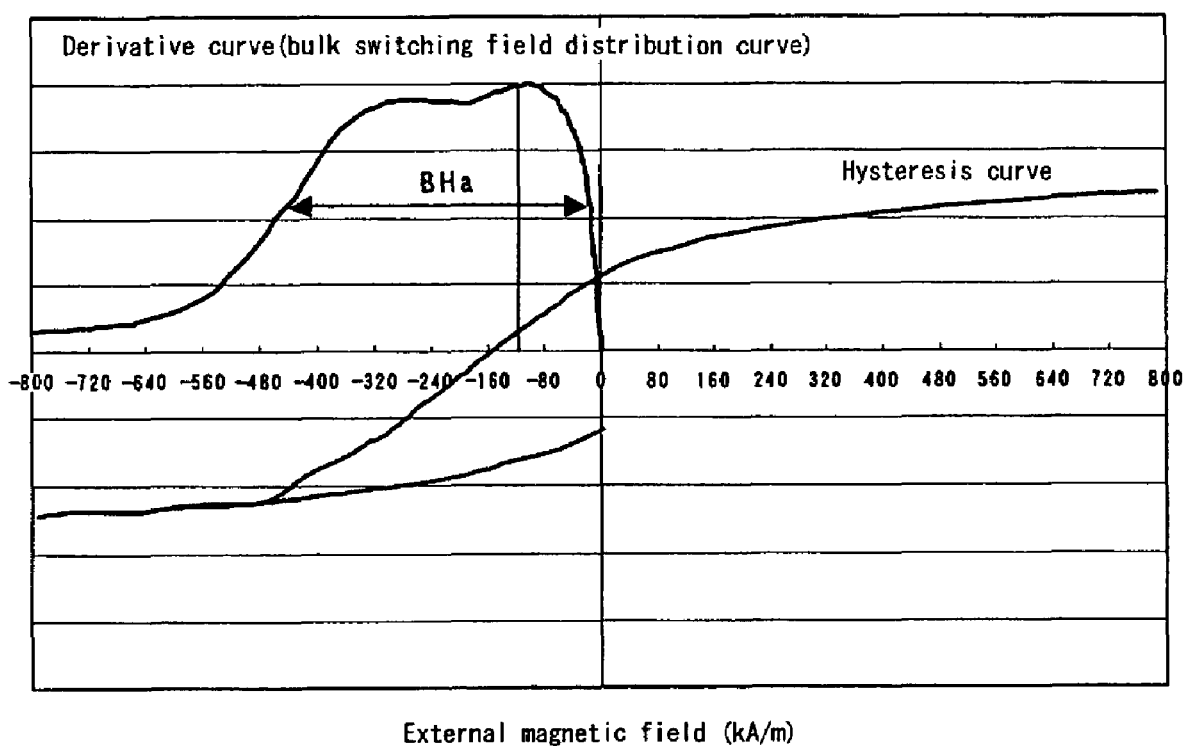
FIG. 2 shows a hysteresis curve and a derivative curve obtained for an iron nitride magnetic powder according to a comparative example (Comparative Example 1).

The powder obtained had an average particle diameter of 25 nm and a BET specific surface area of 45 $m^2/g$. The results of magnetic property evaluation were: Hc=158 KA/m, σs=117 $Am^2/Kg$, and BSFD=2.71. The powder oxidation resistance Δσs was 25.2% and the ratio below Hc 120 KAm in the BSFD was 21.1%. FIG. 2 shows the hysteresis curve and derivative curve obtained for the magnetic powder of this example. The evaluated tape properties were: Hcx=172 KA/m, SFDx=1.65, SQx=0.63, and tape oxidation resistance ΔBm of 13.0%.

The production conditions of the foregoing examples and comparative example, bulk properties and magnetic properties of the powders obtained, and the corresponding tape properties are summarized in Table 1

TABLE 1

| | No. | Starting material | Co (at. %) | Ni (at. %) | Nitriding process Temp. (° C.) | Time (hr.) | System pressure (MPa) | Ave. particle diameter (nm) | BET (m2/g) | Hc (kA/m) | σs (kA2/kg) | BSFD | Δσs (%) |
|---|---|---|---|---|---|---|---|---|---|---|---|---|---|
| Ex | 1 | Magnetite 27 nm | 0 | 0 | 165 | 11 | 0.1 | 25 | 43 | 224 | 111 | 1.41 | 19.8 |
| Ex | 2 | Magnetite 27 nm | 0 | 0 | 165 | 11 | 0.3 | 25 | 44 | 239 | 97 | 1.31 | 23.7 |
| Ex | 3 | Goethite 20 nm | 0 | 0 | 165 | 11 | 0.1 | 15 | 69 | 214 | 67 | 1.77 | 35.3 |
| Ex | 4 | Goethite 20 nm | 3 | 0 | 165 | 11 | 0.1 | 15 | 66 | 210 | 71 | 1.80 | 14.5 |
| Ex | 5 | Goethite 25 nm | 20 | 0 | 165 | 11 | 0.1 | 21 | 55 | 221 | 104 | 1.52 | 8.7 |
| Ex | 6 | Goethite 25 nm | 0 | 10 | 165 | 11 | 0.1 | 20 | 57 | 218 | 102 | 1.62 | 9.0 |
| C. Ex | 1 | Magnetite 27 nm | 0 | 0 | 165 | 11 | <0.01 | 25 | 45 | 158 | 117 | 2.71 | 25.2 |

| | No. | Ratio below Hc 120 kA/m (%) | Hcx (kA/m) | SFDx | SQx | ΔBm (%) |
|---|---|---|---|---|---|---|
| Ex | 1 | 11.6 | 251 | 0.66 | 0.73 | 9.8 |
| Ex | 2 | 9.3 | 265 | 0.56 | 0.75 | 11.8 |
| Ex | 3 | 13.2 | 233 | 0.71 | 0.70 | 16.8 |
| Ex | 4 | 13.5 | 228 | 0.73 | 0.70 | 8.0 |
| Ex | 5 | 11.8 | 244 | 0.68 | 0.71 | 4.6 |
| Ex | 6 | 12.1 | 230 | 0.69 | 0.71 | 4.9 |
| C. Ex | 1 | 21.1 | 172 | 1.65 | 0.63 | 13.0 |

As can be seen from these examples, when nitriding was carried out under pressure as in Examples 1 and 2, the average particle diameter and specific surface area were about the same as those in Comparative Example 1 in which the furnace was not pressurized, but the magnetic properties nevertheless included a high coercive force Hc and a BSFD of 2 or less. These properties were reflected in the tape properties as high Hcx and low SFDx. A particularly noteworthy point is that the ratio of low Hc components was very much lower in Examples 1 and 2 than in Comparative Example 1. This indicates that phases other than the $Fe_{16}N_2$ phase were almost completely absent in Examples 1 and 2, i.e., that powder materials composed substantially of $Fe_{16}N_2$ phase were obtained. Moreover, when an appropriate amount of Co or Ni was contained, as in Examples 4 and 5, the Δσs of the powder material decreased, so that the ΔBm of the tape decreased and the oxidation resistance thereof improved.

Example 7

The iron nitride magnetic powder obtained in Example 1 was used to fabricate a magnetic test tape having a double-layer structure composed of a magnetic layer and a nonmagnetic layer. Magnetic conversion measurement and storage stability evaluation were carried out. In preparing the magnetic coating material, 100 parts by weight of the iron nitride magnetic powder were blended with the materials set out below in the indicated number of parts by weight. In preparing the nonmagnetic powder, 85 parts by weight of nonmagnetic powder were blended with the materials set out below in the indicated number of parts by weight. Both blends were kneaded and dispersed using a kneader and a sand grinder. The obtained coating material for magnetic layer formation and coating material for nonmagnetic layer (underlayer) formation were applied onto a base film composed of an aramid support to obtain the desired underlayer thickness of 2.0 μm and a magnetic layer thickness of 0.20 μm. The magnetic layer was oriented while still damp by exposure to a magnetic field, whereafter drying and calendering were conducted to obtain a double-layer structure magnetic tape.

Magnetic Coating Material Composition

| | |
|---|---|
| Iron nitride magnetic powder | 100 parts by weight |
| Carbon black | 5 parts by weight |
| Alumina | 3 parts by weight |
| Vinyl chloride resin (MR110) | 15 parts by weight |
| Urethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |

Nonmagnetic Coating Material Composition

| | |
|---|---|
| Nonmagnetic powder (α-Fe2O3) | 85 parts by weight |
| Carbon black | 20 parts by weight |
| Alumina | 3 parts by weight |
| Vinyl chloride resin (MR110) | 15 parts by weight |
| Urethane resin (UR8200) | 15 parts by weight |
| Methyl ethyl ketone | 190 parts by weight |
| Cyclohexanone | 80 parts by weight |
| Toluene | 110 parts by weight |

The magnetic properties, i.e., the magnetic conversion properties (C/N, output), of the obtained magnetic tape were measured. In C/N ratio measurement, a drum tester was attached to the recording head and a digital signal was recorded at a recording wavelength of 0.35 μm. At this time, an MR head was used to measure the reproduced signal and noise was measured as demodulation noise. In evaluation, the output and C/N in the case of using the iron nitride magnetic powder of Comparative Example 1 was defined as 0 dB. The results of the evaluations are shown in Table 2.

Examples 8 to 12

Example 7 was repeated except that the iron nitride magnetic powder obtained in Examples 2 to 6 were used. The same evaluations as in Example 7 were carried out. The results are shown in Table 2.

Comparative Example 2

Example 7 was repeated except that the iron nitride magnetic powder obtained in Comparative Example 1 was used. The same evaluations as in Example 7 were carried out. The results are shown in Table 2.

TABLE 2

| | Magnetic | Magnetic conversion measurements | | |
|---|---|---|---|---|
| | powder used | Output (dB) | N(dB) | C/N (dB) |
| Example 7 | Example 1 | 1.0 | −0.8 | 1.8 |
| Example 8 | Example 2 | 1.3 | −1.0 | 2.3 |
| Example 9 | Example 3 | 0.6 | −1.8 | 2.4 |
| Example 10 | Example 4 | 0.4 | −1.6 | 2.0 |
| Example 11 | Example 5 | 0.9 | −1.0 | 1.9 |
| Example 12 | Example 6 | 0.6 | −1.1 | 1.7 |
| Comparative Example 2 | Comparative Example 1 | 0 | 0 | 0 |

As can be seen from the results in Table 2, the double-layer structure magnetic tapes of Examples 7 to 12 fabricated using the iron nitride magnetic powder of Examples 1 to 6 were excellent magnetic recording media that exhibited better output, noise and C/N properties than that of Comparative Example 2.

What is claimed is:

1. An iron nitride magnetic powder comprised primarily of $Fe_{16}N_2$ phase, characterized in that its coercive force Hc is 200 KA/m or greater bulk switching field distribution BSFD is 2 or less.

2. An iron nitride magnetic powder according to claim 1, wherein the ratio below Hc 120 KA/m in the bulk switching field distribution is 15% or less.

3. An iron nitride magnetic powder according to claim 1, wherein the average particle diameter is 50 nm or less.

4. An iron nitride magnetic powder according to claim 1, further comprising one or both of Co and Ni in a total amount expressed in atomic percent based on Fe of 0.1–30 at. %.

5. An iron nitride magnetic powder according to claim 4 whose oxidation resistance index Δσs is 15% or less, where Δσs is a percentage calculated from saturation magnetization values σs before and after storage of the iron nitride magnetic powder in a thermo-hygrostat for one week at 60° C., 90% RH, using the following equation:

100×{(saturation magnetization value before storage)−(saturation magnetization value after storage)}/(saturation magnetization value before storage).

6. An iron nitride magnetic powder according to claim 1, the ratio of $Fe_{16}N_2$ phase being 80% or more as determined by XRD peak integration.

7. An iron nitride magnetic powder according to claim 1, further comprising sinter preventing agents comprising a combination of Al and a rare earth element defined as including Y, wherein Al content is in the range of 5–30 at. % based on Fe and the rare earth element content is in the range of 0.5–10 at. % based on Fe.

8. An iron nitride magnetic powder according to claim 1, further comprising sinter preventing agents comprising a combination of Si and a rare earth element defined as including Y, wherein Si content is in the range of 1–10 at. % based on Fe and the rare earth element content is in the range of 0.5–10 at. % based on Fe.

9. A method of producing an iron nitride magnetic powder comprising:

allowing a nitriding reaction of Fe particles with a nitrogen-containing gas for producing nitrided particles of primarily $Fe_{16}N_2$ phase to proceed under an increased pressure of 0.1 MPa or greater.

10. A method of producing an iron nitride magnetic powder comprising:

allowing a nitriding reaction of Fe particles with ammonia gas for producing nitrided particles of primarily $Fe_{16}N_2$ phase to proceed under an ammonia gas increased pressure of 0.3 MPa or greater.

* * * * *